Nov. 3, 1936.  L. KIMBALL  2,059,363

THROTTLE VALVE

Filed Nov. 14, 1934

Linwood Kimball

INVENTOR.

Patented Nov. 3, 1936

2,059,363

UNITED STATES PATENT OFFICE 2,059,363

THROTTLE VALVE

Linwood Kimball, Danvers, Mass., assignor to Ruggles-Klingemann Mfg. Co., Salem, Mass.

Application November 14, 1934, Serial No. 753,005

10 Claims. (Cl. 277—31)

This invention relates in general to throttle valves for regulating the flow of fluid under pressure such as steam, water or gas, and includes throttle valves which are manually controlled and also those which are automatically controlled from a condition such as temperature or pressure.

The primary object of the invention is to prevent cutting action of the valve seats which ordinarily takes place where there is a high velocity flow across the seats with the valve in a throttled position.

Another object is to provide adjustment whereby the volume of flow is limited without limiting the lift or opening movement of the valve.

It is also an object of the invention to provide a throttle valve which may be arranged for a straight line flow characteristic or any variable flow characteristic which may be desired.

To accomplish the first or primary object of the invention, I provide an internally disposed cage having circumferentially arranged ports with a valve disc seating on the cage and having a skirt adapted to control the flow through the ports, and to close said ports in advance of the seating of the valve disc. In this way I throttle and expand the elastic fluid across these ports instead of across the ground seats of the valve closing disc.

Such an arrangement of valve structure is suitably adapted for carrying out the second and third objects of my invention namely, the embodiment of an arrangement whereby the controlling valve may be rotated to limit the effective area through the ports and the shaping of the ports to effect the proper flow characteristics.

Figure 1:
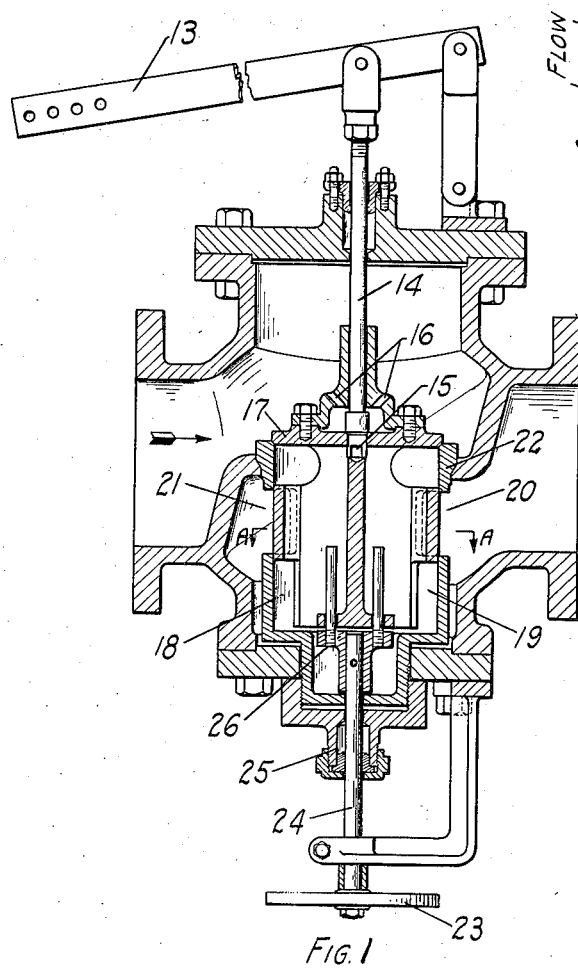

The several embodiments of the invention are described in the following specifications, and illustrated in the accompanying drawing, in which Fig. 1 shows a vertical sectional elevation of a type of valve in which the valve control element may be rotatably adjusted to limit the effective area through the valve ports, when the valve is in an open position.

Figure 4:
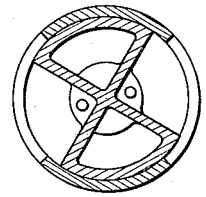
Figure 3:
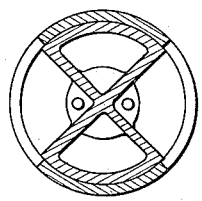
Figure 2:

Figs. 2, 3, and 4 show a cross section of the cage and valve element, Fig. 2 being taken on line A—A with the valve in a closed position. Fig. 3 shows a wide open port with the valve at full lift, and Fig. 4 shows the valve at full lift but rotatively adjusted to reduce the effective area through the ports.

Figure 5:
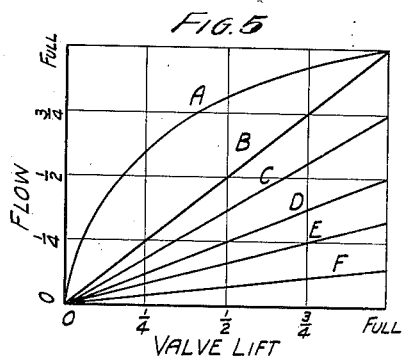

Fig. 5 is a chart showing the flow characteristic which will later be explained in connection with the various embodiments.

It should be understood that the several embodiments shown is primarily for the purpose of illustrating the principles of the invention, and that the arrangement of parts and details of construction may be modified or changed by those skilled in the art, without departing from the spirit or scope of the invention.

Now referring to Fig. 1, it will be noted that this valve is arranged for lever operation. This valve being especially adapted for use in connection with some type of auxiliary operating means responsive to the condition to be controlled, it sometimes is found more convenient to operate the controlling valve by means of a fulcrumed lever indicated as (13) pivoted to the valve stem (14). The special feature of this valve is the hand wheel adjustment at the bottom, whereby the valve element (17) is adjustably rotated to close off more or less of the ports registering between the valve element and the ports (20) and (21) in the cylindrical cage (22).

In this type of valve, the fluid pressure flow is in the direction indicated by the arrow. The first operation is to lift the valve stem (14) which opens orifice (15) allowing pressure to enter through ports (16) and fill the chamber below the valve disc, thus equalizing the pressure on both sides of valve disc. Thereafter the main valve disc (17) can be lifted with a minimum of effort. It will be noted that the downwardly extending skirt of valve disc (17) is cut away on opposite sides as at (18) and (19) in order that these cut away sections will register with the ports (20) and (21) in the valve cage (22).

Now, the valve disc is lifted away from its ground seats slightly in advance of the opening of these ports. This is to allow relatively high pressure to be maintained within the valve cage for all degrees of opening and closing movement of the valve element (17), and in this way maintain a relatively slow velocity flow past the ground seats as compared with the velocity flow through the ports (20) and (21). It is conceivable that the full area of these ports will not be required or desirable, and for this reason, I have provided means for rotating the valve element to cut down the effective area through these ports.

In the illustration I show a hand wheel (23) for operating a valve stem (24). The valve stem (24) extending through a stuffing box (25) and connected to a forked element (26). This forked element (26) is arranged to rotate the valve element into such positions as to regulate the effective area through the ports, or that registering between the cut away sections (18) and (19)

and the ports (20) and (21), in the valve cage. Now, as a result of this adjustment, a total flow may be obtained as shown at B, of Fig. 5 for full valve ports, or the ports may be cut down by adjustment to give a total flow at full valve lift as indicated by C, D, E, or F, or the adjustment can be such as to completely cover the ports so there will be relatively no flow at full lift of the valve element.

Assuming the full port adjustment as shown in Fig. 3 corresponding to a flow as shown at B, on the chart, then the adjustment as shown in Fig. 4 would correspond to a flow approximately as shown at C.

In several illustrations it will be noted that the skirt of the valve element is connected with the valve disc part of the valve element by means of cross webs, this arrangement permits space between the upper end of the skirt and the lower side of the valve disc for a free flow of fluid into the valve cage.

It will now be seen that I have illustrated and described various embodiments of my invention covering the various objects as herein set forth, and it will be understood that the invention may be embodied in many other forms without departing from the spirit or scope of the invention, except as required by the following claims when construed in the light of the prior art.

I claim:—

1. A valve structure of the character described, comprising a valve casing having an internally disposed cylindrical cage, provided with one or more circumferentially disposed ports, a valve disc adapted to seat on said cage and having a downwardly extending skirt adapted to close said port or ports in advance of the seating of said valve disc and means operated independently of the valve disc opening and closing means, for rotatably adjusting said valve to limit the effective area through said port or ports when said valve disc is open.

2. A valve structure of the character described comprising a valve casing having an inlet and an outlet for passage of fluid under pressure, a partition wall separating the inlet from the outlet, an orifice in said partition wall, a cylindrical chamber below said orifice, one or more circumferentially disposed port or ports in said chamber, a valve disc adapted to close said orifice and having a downwardly extending skirt adapted to close said port or ports in advance of the closing of said orifice, means to operate said valve to regulate the flow of fluid pressure from the inlet to the outlet of said valve casing and means operated independently of the valve operating means to rotatably adjust said valve to limit the effective area through said ports when said valve is open.

3. A valve structure of the character described comprising a valve casing, a partition wall in said casing, an aperture therethrough, a cylindrical chamber below said aperture, said chamber having one or more circumferentially disposed port or ports in said chamber, a main valve adapted to close said aperture and having a downwardly extending skirt adapted to close said ports, an orifice in the main valve, a pilot valve controlling said orifice, means to operate said pilot valve to open said orifice and thereafter open the main valve and means operated independently of the valve opening and closing means for rotatably adjusting said valve to limit the effective area through said ports when said valve is open.

4. A valve structure of the character described comprising a valve casing having an inlet and an outlet for the passage of fluid under pressure, an internally disposed cylindrical cage provided with one or more circumferentially disposed ports, a main valve adapted to seat on said cage and having a downwardly extending skirt adapted to close said port or ports in advance of the seating of said main valve, a pilot valve controlling an orifice in the main valve and adapted to be operated to first open said orifice to equalize the pressure in the valve cage to balance the pressure on the main valve with that of the inlet pressure and thereafter open said main valve to maintain relative high pressure in the valve cage for the entire opening and closing movement of the valve port or ports and means operated independently of the valve opening and closing means for rotatably adjusting said valve to limit the effective area through said ports when said valve is open.

5. A valve structure of the character described comprising a valve casing having an inlet and an outlet for the passage of fluid under pressure, a partition wall separating the inlet from the outlet, an aperture in said partition wall, a cylindrical chamber on the down stream side of said aperture, one or more circumferentially disposed port or ports in said chamber, a main valve seating in the direction of flow adapted to close said aperture and having a downwardly extending skirt adapted to close said port or ports in advance of the closing of said aperture, a pilot valve controlling an orifice in the main valve, means to operate said pilot valve to first open said orifice to balance the pressure on the main valve and thereafter open said main valve and means operated independently of the valve opening means for rotatably adjusting said valve to limit the effective area through said ports when said valve is open.

6. A valve structure of the character described comprising a valve casing having an inlet and an outlet for the passage of fluid under pressure, a wall dividing the casing into high and low pressure chambers, and an aperture therethrough, an internally disposed cylindrical cage fitted in said aperture and provided with one or more circumferentially disposed ports, a main valve adapted to seat on said cage and having a downwardly extending skirt adapted to close said port or ports in advance of the seating of said main valve, an orifice in said main valve, a pilot valve controlling said orifice and means to operate said pilot valve to first open said orifice to balance the pressure on the main valve with that of the inlet pressure and thereafter open the main valve to maintain relative high pressure within the cage for all degrees of opening and closing movement of the cage port or ports and means to rotatably adjust said valve to limit the effective area through said ports when said valve is open.

7. A valve structure of the character described comprising a valve casing having an inlet and an outlet for the passage of fluid under pressure, a partition wall dividing the inlet from the outlet, an aperture in said wall, a cylindrical chamber extending downward from said aperture and having one or more circumferentially disposed ports, a valve disc seating over said aperture and having a downwardly extending skirt adapted to close said port or ports in advance of the closing of said valve, said skirt having one or more cut away sections adapted to register with the port or ports in the cylindrical chamber, means to reciprocate said valve to open and close said ports, and means independent of the reciprocating means to rotatively adjust said valve to regulate the effective area through said port or ports when said valve is in an open position.

8. A valve structure of the character described comprising a valve casing having an inlet and an outlet for the passage of fluid under pressure, a partition wall dividing the inlet from the outlet, an aperture in said wall, a cylindrical chamber fitted in said aperture and extending downward with a closed bottom end, said cylinder having one or more circumferentially arranged ports, a main valve seating in the direction of flow on the open end of said cylinder and having a downwardly extending skirt adapted to close said port or ports in advance of the closing of said valve, said skirt having one or more cut away sections adapted to register with the port or ports in the cylindrical chamber when said valve is in an open position, a by-pass port in the main valve, a valve controlling said by-pass, a valve stem operatively connected with the by-pass valve, means to operate said valve stem to open the by-pass to equalize the pressure on the main valve and thereafter open the main valve and means to rotatively adjust said main valve to regulate the effective area through the valve ports when said main valve is in open position.

9. A valve structure of the character described, comprising a valve casing, a cylindrical chamber disposed within said casing forming a passage way between the inlet and the outlet of said valve, said chamber having one or more circumferentially arranged ports, a valve seating over the open end of said chamber, said valve having a downward extension adapted to close said port or ports in the cylindrical chamber, means to open and close said valve and simultaneously open and close said ports, and means independent of the opening and closing means for rotatably adjusting said valve to limit the effective area through said port or ports.

10. A valve structure of the character described, comprising a valve casing, a cylindrical chamber disposed within said casing forming a passage way between the inlet and the outlet of said valve, said chamber having one or more circumferentially arranged ports, a valve seating over the open end of said chamber, said valve having a downward extension adapted to close said port or ports in the cylindrical chamber, a valve stem extending through the top cover of said valve casing and adapted to open and close said valve, and simultaneously open and close said ports, and a stem connection extending through the bottom cover of said valve casing adapted to rotatably adjust said valve to limit the effective area through said ports when said valve is open.

LINWOOD KIMBALL.